United States Patent
Cohen et al.

(10) Patent No.: US 6,886,609 B2
(45) Date of Patent: *May 3, 2005

(54) MOBILE HYDROGEN GENERATION AND SUPPLY SYSTEM

(75) Inventors: Joseph Perry Cohen, Bethlehem, PA (US); Tama Maya Copeman, Emmaus, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/782,361

(22) Filed: Feb. 19, 2004

(65) Prior Publication Data

US 2004/0187950 A1 Sep. 30, 2004

Related U.S. Application Data

(63) Continuation of application No. 10/396,290, filed on Mar. 25, 2003, now Pat. No. 6,745,801.

(51) Int. Cl.$^7$ .............................................. B05B 31/00
(52) U.S. Cl. .............................. 141/231; 141/2; 141/18
(58) Field of Search ........................... 141/2–4, 11, 18, 141/231; 62/46.2; 48/197 R

(56) References Cited

U.S. PATENT DOCUMENTS

| | | | |
|---|---|---|---|
| 4,211,537 A | 7/1980 | Teitel | 48/191 |
| 5,409,046 A | 4/1995 | Swenson et al. | 141/11 |
| 5,702,491 A | 12/1997 | Long et al. | 48/197 R |
| 5,762,119 A | 6/1998 | Platz et al. | 141/231 |
| 5,778,972 A | 7/1998 | Sapru et al. | 165/104.12 |
| 5,861,137 A | 1/1999 | Edlund | 423/652 |
| 5,954,101 A | 9/1999 | Drube et al. | 141/82 |

(Continued)

FOREIGN PATENT DOCUMENTS

| | | | |
|---|---|---|---|
| EP | 0957063 | 11/1999 | C01B/3/34 |
| WO | 01/28017 | 4/2001 | H01M/8/00 |
| WO | 01/92147 | 12/2001 | C01B/3/32 |

OTHER PUBLICATIONS

Idatech Product Brochure, 2002.
Proton Energy Systems Product Brochure, Rev. 08/01 and 06/01.
Millennium Cell—Website for Hydrogen on Demand Fact Sheet, downloaded on Jan. 24, 2003.
Proton Energy Systems—Website for Hydrogen Generator download brochure, downloaded on Feb. 11, 2003.

Primary Examiner—Gregory L. Huson
Assistant Examiner—Peter T deVore
(74) Attorney, Agent, or Firm—Keith D. Gourley

(57) ABSTRACT

Mobile hydrogen generation and supply system comprising hydrogen precursor storage means for storing one or more hydrogen precursors; one or more hydrogen precursor conversion means selected from the group consisting of means for converting a hydrogen precursor into gaseous hydrogen and means for converting a hydrogen precursor into a hydrogen-containing intermediate; one or more delivery means selected from the group consisting of delivery means for offloading gaseous hydrogen and delivery means for offloading a hydrogen-containing intermediate; and mobile support means for mounting the hydrogen precursor storage means, hydrogen precursor conversion means, and one or more delivery means. The system may further comprise one or more means selected from the group consisting of means for converting gaseous hydrogen into stored hydrogen; means for containing stored hydrogen; means for converting stored hydrogen into gaseous hydrogen; and storage means for storing a hydrogen-containing intermediate. Mobile support means for mounting the apparatus for these functions may be transported by trucks, tractor-trailers, rail cars, barges, ships, or aircraft.

13 Claims, 1 Drawing Sheet

U.S. PATENT DOCUMENTS

| | | | |
|---|---|---|---|
| 5,964,965 A | 10/1999 | Schulz et al. | 148/420 |
| 5,983,962 A | 11/1999 | Gerardot | 141/231 |
| 5,997,594 A | 12/1999 | Edlund et al. | 48/76 |
| 6,193,929 B1 | 2/2001 | Ovshinsky | 420/402 |
| 6,221,117 B1 | 4/2001 | Edlund et al. | 48/76 |
| 6,305,442 B1 | 10/2001 | Ovshinsky et al. | 141/231 |
| 6,375,906 B1 | 4/2002 | Edlund et al. | 422/189 |
| 6,745,801 B1 * | 6/2004 | Cohen et al. | 141/231 |
| 2002/0029820 A1 | 3/2002 | Ovshinsky et al. | 141/110 |
| 2002/0073618 A1 | 6/2002 | Ovshinsky et al. | 48/61 |
| 2003/0009942 A1 | 1/2003 | Amendola et al. | 48/61 |

* cited by examiner

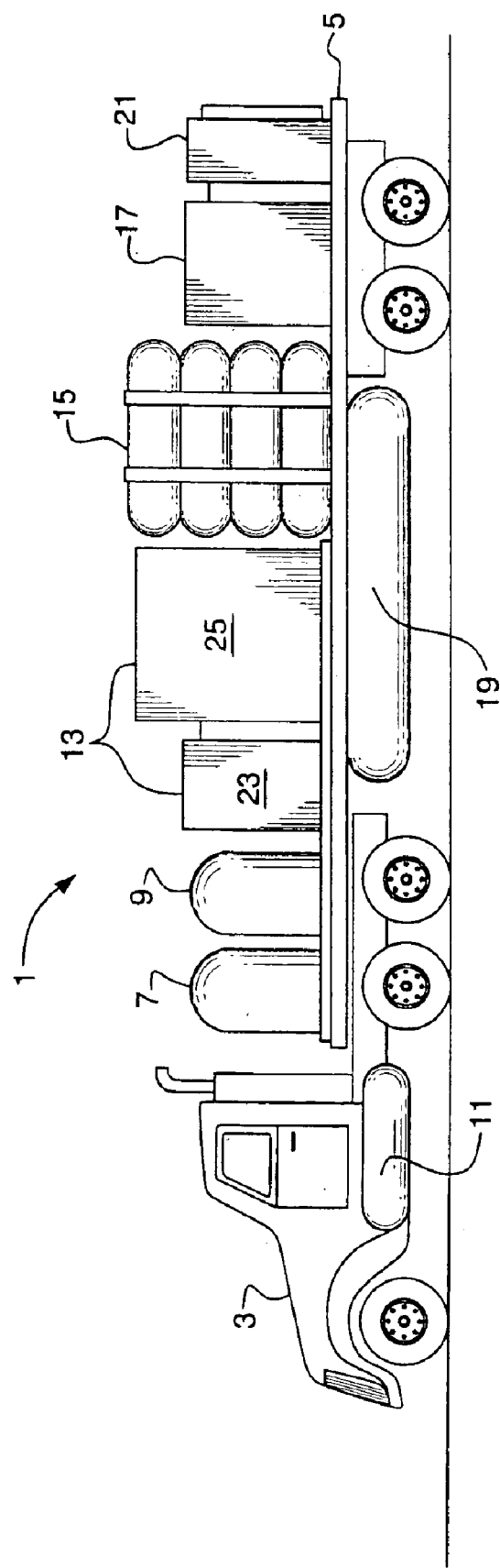

MOBILE HYDROGEN GENERATION AND SUPPLY SYSTEM

CROSS-REFERENCE TO RELATED APPLICATIONS

This application is a continuation of U.S. Ser. No. 10/396,290 filed on Mar. 25, 2003 now U.S. Pat. No. 6,745,801.

BACKGROUND OF THE INVENTION

The developing use of hydrogen as an energy carrier will require broad-based and flexible hydrogen supply systems to provide hydrogen efficiently to a large number of geographically-dispersed hydrogen consumers. The hydrogen supply infrastructure will be highly decentralized and will have many diverse users with a wide range of hydrogen requirements. Hydrogen may be generated at user sites for immediate consumption, stored for future use, or dispensed for mobile use. Alternatively, hydrogen may be generated at central production sites, transported to local sites, and stored at the local sites, where the stored hydrogen may be used, held for future onsite use, or dispensed for mobile use.

Numerous hydrogen applications are being developed, including hydrogen-powered fuel cell or internal combustion vehicles, stationary power applications, backup power units, power grid management, power for remote locations, and portable power applications in consumer electronics, business machinery, and recreational equipment. Hydrogen dispensing stations will be needed for vehicle refueling, and smaller refill centers will be needed for portable devices such as computers, mobile communication devices, and other electronic equipment.

Because the hydrogen volume requirements in these applications will vary significantly and because the diverse users will be geographically dispersed, the logistics of hydrogen supply under normal conditions will be complex but manageable. Under abnormal conditions, however, hydrogen supply logistics may be especially complex and unpredictable. Abnormal conditions would occur, for example, when onsite hydrogen generators malfunction or are shut down for maintenance, or alternatively when local hydrogen demand temporarily exceeds local supply capability or storage capacity.

There is a need for flexible and adaptable hydrogen supply methods to address these problems and supply hydrogen to growing energy-related markets for hydrogen. Embodiments of the present invention, which are described below and defined by the claims that follow, address this need and offer flexible hydrogen supply alternatives for varied user requirements under both normal and abnormal demand conditions.

BRIEF SUMMARY OF THE INVENTION

Embodiments of the invention include a mobile hydrogen generation and supply system comprising (a) hydrogen precursor storage means for storing one or more hydrogen precursors; (b) one or more hydrogen precursor conversion means selected from the group consisting of means for converting a hydrogen precursor into gaseous hydrogen and means for converting a hydrogen precursor into a hydrogen-containing intermediate; (c) one or more delivery means selected from the group consisting of delivery means for offloading gaseous hydrogen and delivery means for offloading a hydrogen-containing intermediate; and (d) mobile support means for mounting (a) through (c).

The one or more hydrogen precursors may be selected from the group consisting of water, hydrocarbons, oxygenated hydrocarbons, fixed metal hydrides, transferable metal hydrides, hydrogen-containing porous adsorptive solids, liquid hydrogen, and a mixed gas containing hydrogen. The hydrogen precursor conversion means may comprise one or more process systems selected from the group consisting of water electrolysis, hydrocarbon reforming, hydrocarbon partial oxidation, oxygenated hydrocarbon reforming, fixed metal hydride heating, heating and/or pressure reduction of hydrogen-containing porous solids, and contacting a stabilized aqueous slurry of a transferable metal hydride with a catalyst.

The mobile hydrogen generation and supply system may further comprise one or more means selected from the group consisting of means for converting gaseous hydrogen into stored hydrogen; means for containing stored hydrogen; means for converting stored hydrogen into gaseous hydrogen; and storage means for storing a hydrogen-containing intermediate.

The means for converting the gaseous hydrogen into stored hydrogen may comprise one or more process systems selected from the group consisting of compression, contacting the gaseous hydrogen with one or more hydrogen-reactive metals to form fixed metal hydrides, and contacting the gaseous hydrogen with one or more hydrogen-adsorbing porous solids. The means for containing stored hydrogen may comprise one or more systems selected from the group consisting of pressurized gas cylinders, fixed metal hydride storage cylinders, porous adsorptive solids storage cylinders, and cryogenic liquid storage tanks.

The means for converting stored hydrogen into gaseous hydrogen may comprise one or more systems selected from the group consisting of gas pressure regulators, fixed metal hydride storage cylinder heating systems, porous adsorptive solids storage cylinder heating systems, gas compression systems, and cryogenic liquid vaporizers. The delivery means may comprise one or more systems selected from the group consisting of flexible pressurized gas hoses with gas dispensing connections; a portable crane for lifting pressurized gas cylinders, fixed metal hydride storage cylinders, or porous adsorptive solids storage cylinders; and means for offloading a hydrogen-containing intermediate.

The mobile support means for mounting (a) through (c) comprises transportation means selected from the group consisting of trucks, trailers, tractor-trailers, rail cars, barges, ships, and aircraft.

Another embodiment of the invention includes a method for the mobile generation and storage of hydrogen comprising (a) providing a mobile hydrogen generation and supply system comprising hydrogen precursor storage means for storing one or more hydrogen precursors; hydrogen precursor conversion means for converting a hydrogen precursor into gaseous hydrogen; gaseous hydrogen conversion means for converting gaseous hydrogen into stored hydrogen; hydrogen storage means for containing stored hydrogen; stored hydrogen conversion means for converting stored hydrogen into gaseous hydrogen; gaseous hydrogen delivery means for offloading gaseous hydrogen; and mobile support means for mounting the hydrogen precursor storage means, hydrogen precursor conversion means, gaseous hydrogen conversion means, hydrogen storage means, stored hydrogen conversion means, and gaseous hydrogen delivery means;

(b) transporting the mobile hydrogen generation and supply system to a first location and loading one or more hydrogen precursors into respective storage means for storing the one or more hydrogen precursors;

(c) transporting the mobile hydrogen generation and supply system from the first location to a second location while concurrently generating gaseous hydrogen by converting one or more of the hydrogen precursors into gaseous hydrogen and converting the gaseous hydrogen into stored hydrogen; and (d) at a second location having a receiving facility, (1) offloading at least a portion of the stored hydrogen, or (2) converting at least a portion of the stored hydrogen to gaseous hydrogen and offloading the gaseous hydrogen, or (3) offloading at least a portion of the stored hydrogen and converting at least another portion of the stored hydrogen to gaseous hydrogen and offloading the gaseous hydrogen.

The method may further comprise generating gaseous hydrogen at the second location by converting one or more of the hydrogen precursors into gaseous hydrogen and offloading the gaseous hydrogen to the receiving facility at the second location.

An alternative embodiment of the invention relates to a method for supplying a hydrogen-containing intermediate comprising (a) providing a mobile hydrogen generation and supply system at a first location, the system comprising precursor storage means for storing one or more hydrogen precursors; hydrogen precursor conversion means for converting a hydrogen precursor into a hydrogen-containing intermediate; hydrogen-containing intermediate storage means for storing the hydrogen-containing intermediate; delivery means for offloading a hydrogen-containing intermediate; and mobile support means for mounting the precursor storage means, hydrogen precursor conversion means, hydrogen-containing intermediate storage means, and delivery means;

(b) transporting the mobile hydrogen generation and supply system from the first location to a second location while concurrently converting a hydrogen precursor into a hydrogen-containing intermediate and storing the hydrogen-containing intermediate; and (c) offloading the hydrogen-containing intermediate to a receiving facility at the second location.

The hydrogen precursor may be methanol, the hydrogen precursor conversion means may comprise a methanol reforming system, and the hydrogen-containing intermediate may comprise synthesis gas containing at least hydrogen and carbon dioxide.

The hydrogen precursor may be sodium borohydride powder, the hydrogen precursor conversion means may comprise a system to mix the sodium borohydride with sodium hydroxide and water to provide a stabilized transferable metal hydride slurry, and the hydrogen-containing intermediate may be the stabilized metal hydride slurry.

In another embodiment, the invention includes a method for supplying hydrogen to one or more receiving locations comprising (a) providing a mobile hydrogen generation and supply system comprising hydrogen precursor storage means for storing one or more hydrogen precursors; hydrogen precursor conversion means for converting a hydrogen precursor into gaseous hydrogen; gaseous hydrogen conversion means for converting gaseous hydrogen into stored hydrogen; hydrogen storage means for containing stored hydrogen; stored hydrogen conversion means for converting stored hydrogen into gaseous hydrogen; gaseous hydrogen delivery means for offloading gaseous hydrogen; and mobile support means for mounting the hydrogen precursor storage means, hydrogen precursor conversion means, gaseous hydrogen conversion means, hydrogen storage means, stored hydrogen conversion means, and gaseous hydrogen delivery means;

(b) identifying the one or more receiving locations;

(c) determining one or more hydrogen precursors required to generate hydrogen for the one or more receiving locations;

(d) determining a source location or locations for the one or more hydrogen precursors and moving the mobile hydrogen generation and supply system to the source location or locations;

(e) loading and storing the one or more hydrogen precursors in the hydrogen precursor storage means at the source location or locations;

(f) transporting the mobile hydrogen generation and supply system from the source location or locations to the one or more receiving locations while concurrently generating gaseous hydrogen by converting one or more of the hydrogen precursors into gaseous hydrogen and converting the gaseous hydrogen to stored hydrogen; and (g) at each of the one or more receiving locations, (1) offloading at least a portion of the stored hydrogen by offloading the hydrogen storage means, or (2) converting at least a portion of the stored hydrogen to gaseous hydrogen and offloading the gaseous hydrogen, or (3) offloading at least a portion of the stored hydrogen by offloading the hydrogen storage means and converting at least another portion of the stored hydrogen to gaseous hydrogen and offloading the gaseous hydrogen.

The one or more hydrogen precursors may comprise methanol, the hydrogen precursor conversion means may comprise a methanol reformer, and the hydrogen storage means for containing stored hydrogen may comprise a fixed metal hydride hydrogen storage system.

In a related embodiment, the invention includes a method for supplying a hydrogen-containing intermediate comprising (a) providing a mobile hydrogen generation and supply system at a first location, the system comprising precursor storage means for storing one or more hydrogen precursors; hydrogen precursor conversion means for converting a hydrogen precursor into a hydrogen-containing intermediate; hydrogen-containing intermediate storage means for storing the hydrogen-containing intermediate; delivery means for offloading a hydrogen-containing intermediate; and mobile support means for mounting the precursor storage means, hydrogen precursor conversion means, hydrogen-containing intermediate storage means, and delivery means;

(b) identifying the one or more receiving locations;

(c) determining one or more hydrogen precursors required to generate hydrogen for the one or more receiving locations;

(d) determining a source location or locations for the one or more hydrogen precursors and moving the mobile hydrogen generation and supply system to the source location or locations;

(e) loading and storing the one or more hydrogen precursors in the hydrogen precursor storage means at the source location or locations;

(f) transporting the mobile hydrogen generation and supply system from the source location or locations to the one or more receiving locations while concurrently converting one of the one or more hydrogen precursors into a hydrogen-containing intermediate and storing the hydrogen-containing intermediate; and (g) at each of the one or more receiving locations, offloading at least a portion of the stored hydrogen-containing intermediate.

The hydrogen precursor may be methanol, the hydrogen precursor conversion means may comprise a methanol reforming system, and the hydrogen-containing intermediate may comprise synthesis gas containing at least hydrogen and carbon dioxide.

Alternatively, the hydrogen precursor may be sodium borohydride powder, the hydrogen precursor conversion means may include a system to mix the sodium borohydride with sodium hydroxide and water to provide a stabilized transferable metal hydride slurry, and the hydrogen-containing intermediate may be the stabilized metal hydride slurry.

BRIEF DESCRIPTION OF SEVERAL VIEWS OF THE DRAWINGS

The single FIGURE is an illustration of a mobile hydrogen generation and supply system utilizing a tractor-trailer.

DETAILED DESCRIPTION OF THE INVENTION

Hydrogen is provided in embodiments of the present invention by the use of a mobile hydrogen generation and supply system that includes apparatus for producing, storing, and delivering hydrogen. The system may be operated in several different embodiments including, for example, loading a hydrogen precursor at a first location, generating hydrogen from the precursor and storing the generated hydrogen while transporting the system to a second location, and recovering the stored hydrogen and offloading the recovered gaseous hydrogen at the second location. In an extension of this embodiment, additional hydrogen may be generated by the system at the second location from a hydrogen precursor previously loaded at the first location or provided to the system at the second location. In an alternative embodiment, the system may generate hydrogen at a location for an extended time from a hydrogen precursor provided to the system at that location. Other embodiments are possible in which the system is moved among a series of locations with any combination of loading hydrogen precursors, generating hydrogen (either en route or at a location), storing hydrogen (either en route or at a location), and recovering and offloading gaseous hydrogen. Alternatively or additionally, stored hydrogen can be offloaded as stored hydrogen (for example, as portable compressed gas cylinders or as portable metal hydride storage cylinders) at a site for future conversion to gaseous hydrogen at the site.

The mobile hydrogen generation and supply system may be utilized to meet diverse hydrogen user requirements. Some exemplary applications include supplying small hydrogen consumers who wish to avoid the capital, operating, and maintenance costs of an onsite hydrogen generator, and supplying hydrogen to a consumer whose onsite generator is shut down for planned maintenance or because of an emergency outage. Other applications may include providing standby hydrogen during startup and testing of a new onsite hydrogen generator and providing initial hydrogen supply during a delayed startup of a new onsite hydrogen generator. The system may be used to supply extra hydrogen capacity at a location during a temporary period of high hydrogen demand, provide a temporary onsite dispensing station for vehicle refueling, and supply hydrogen for a short-term onsite requirement. The system also may be used to provide hydrogen for stationary hydrogen-based generators such as fuel cells that may be used for backup power or for continuous power generation.

The following definitions apply to terms used in the present disclosure.

A mobile hydrogen generation and supply system includes apparatus for producing, storing, and delivering hydrogen, wherein the system is capable of being moved or transported, either under its own power (e.g., a truck, tractor-trailer, aircraft, or ship) or by separate locomotion (e.g., a rail car, a trailer, a barge, or a skid-mounted system).

A hydrogen precursor comprises hydrogen in a non-gaseous state or in an impure gaseous state wherein hydrogen is mixed with other gaseous components. Exemplary precursors are water, hydrocarbons, oxygenated hydrocarbons such as alcohols, metal hydrides in granular, monolith, or powdered form, and liquid hydrogen. Alternatively, a hydrogen precursor may be a porous adsorptive solid containing physically or chemically adsorbed hydrogen. Synthesis gas containing hydrogen and other components is considered a hydrogen precursor. High purity gaseous hydrogen can be obtained from any of these hydrogen precursors. A hydrogen precursor may be loaded onto a mobile hydrogen generation and supply system.

A metal hydride is an inorganic chemical complex or compound in which hydrogen is chemically and reversibly bound with one or more reactive metals or alloys of reactive metals such as, for example, magnesium, lithium, aluminum, sodium, boron, nickel, and other reactive metals known in the art. A fixed metal hydride is a metal hydride in fixed form, i.e., granules, extrudates, monoliths, or other solid forms contained in a cylinder, vessel, or canister. A transferable metal hydride is a metal hydride in flowable powder form, a flowable slurry of a metal hydride powder, a solution of metal hydride in water or other liquid, or a combined slurry and solution in which a portion of metal hydride is dissolved and a portion is not dissolved.

A hydrogen-containing intermediate is a medium generated from a hydrogen precursor wherein the medium can be converted in another step or steps into gaseous hydrogen. A hydrogen-containing intermediate may be, for example, a stabilized aqueous slurry or solution of transferable metal hydride, i.e., a slurry or solution of transferable metal hydride powder in water with a stabilizing compound that retards the reaction of the metal hydride with water.

Stored hydrogen is defined as hydrogen in a fixed non-gaseous state, a non-flowable gaseous state (i.e., compressed gas in a pressurized cylinder or cylinders), or an impure gaseous state. Pure flowable gaseous hydrogen can be readily recovered from stored hydrogen for delivery to a receiving facility. The term flowable defines hydrogen that can flow via piping and delivery systems to the receiving facility. Stored hydrogen may include, for example, fixed metal hydrides, physically or chemically adsorbed hydrogen on porous solids, compressed hydrogen stored in cylinders, liquid hydrogen, and mixtures of hydrogen gas with other gaseous components. Gaseous hydrogen may be readily converted into any of these forms of stored hydrogen in a mobile hydrogen generation and supply system as described herein.

Precursor conversion is the process of converting a hydrogen precursor to a more accessible form of hydrogen such as gaseous hydrogen or a hydrogen-containing intermediate. Gaseous hydrogen conversion is the process of converting gaseous hydrogen into stored hydrogen. Means for gaseous hydrogen conversion typically include compression and piping systems for directing gaseous hydrogen from the precursor conversion system to the storage system and for contacting the gaseous hydrogen with storage media as required. Gaseous hydrogen may be produced from a hydrogen precursor, produced from a hydrogen-containing intermediate, or recovered from stored hydrogen.

Offloading is the process of transferring gaseous hydrogen, stored hydrogen, or a hydrogen-containing intermediate from a mobile hydrogen generation and supply system to a receiving facility. A receiving facility comprises process equipment at a receiving location wherein the process equipment consumes and/or stores hydrogen. Dispensing is the process of transferring gaseous hydrogen to a vehicle or device having a hydrogen storage system.

Transporting is the process of moving the mobile hydrogen generation and supply system from a first location to one or more other locations. At any of the locations, hydrogen precursor may be loaded, gaseous hydrogen may be offloaded, a hydrogen-containing intermediate may be offloaded, and/or stored hydrogen may be offloaded. During transporting from one of location to another location, the system may be en route or in motion over the road, stopped for refueling, stopped for driver rest, or stopped for other reasons.

A hydrocarbon is an organic compound or mixture of compounds containing carbon and hydrogen, and includes, for example, methane, natural gas, propane, liquefied petroleum gas (LPG), gasoline, and diesel fuel. An oxygenated hydrocarbon is a hydrocarbon containing oxygen such as, for example, methanol or higher alcohols.

Mobile support means include, but are not limited to, platforms, pallets, skids, rail cars, and trailers for mounting the various pieces of hydrogen processing and storage equipment of a mobile hydrogen generation and supply system. The mobile support means may be mounted on self-propelled transportation means (e.g., trucks, tractor-trailers, aircraft, or ships) or on transportation means which must be moved by separate locomotion (e.g., rail cars, trailers, barges, transportable skids, and the like).

The following Table 1 summarizes the various hydrogen-containing materials which can be utilized as hydrogen precursors and/or stored hydrogen for the embodiments of the invention described herein.

TABLE 1

Hydrogen-Containing Materials as Hydrogen Precursors and Stored Hydrogen

| Material | Hydrogen Precursor | Stored Hydrogen |
| --- | --- | --- |
| Water | Yes | No |
| Hydrocarbon | Yes | No |
| Oxygenated Hydrocarbon | Yes | No |
| Fixed Metal Hydride | Yes | Yes |
| Transferable Metal Hydride | Yes | No |
| Adsorbed Hydrogen | Yes | Yes |
| Compressed Hydrogen | No | Yes |
| Liquid Hydrogen | Yes | Yes |
| $H_2$-Containing mixed Gas | Yes | Yes |

An exemplary mobile hydrogen generation and supply system is illustrated by a tractor-trailer shown in the single FIGURE. Mobile hydrogen generation and supply system 1 comprises tractor 3 and trailer 5, wherein the trailer provides the mobile support means for mounting the various pieces of hydrogen processing and storage equipment. In this example, hydrogen precursor storage means are shown as tanks 7 and 9 mounted behind tractor 3. In general, the hydrogen precursor storage means may include one or more storage systems selected from storage tanks for water and/or other liquids, pressurized gas cylinders, fixed metal hydride storage cylinders or canisters, transferable metal hydride storage tanks, porous adsorptive solids storage cylinders, and cryogenic liquid storage tanks. Stored water may be filtered, deionized, or otherwise pretreated. While two storage tanks are shown, any number and type of storage means may be included. If desired, fuel tank 11 of tractor 3 may be used as a source of hydrocarbon feed (diesel fuel or gasoline) for hydrogen generation or as a process energy source. As summarized in Table 1 above, one or more hydrogen precursors may be selected from water, hydrocarbons, oxygenated hydrocarbons, fixed metal hydrides, transferable metal hydrides, hydrogen-containing porous adsorptive solids, liquid hydrogen, and hydrogen-containing mixed gas.

The hydrogen precursor is converted to gaseous hydrogen by hydrogen precursor conversion means or system 13, which may be operated while the tractor-trailer is parked at a main terminal, is en route to a receiving location, is parked at the receiving location, or combinations thereof. Hydrogen conversion system 13 may include one or more types of hydrogen conversion process equipment selected from water electrolysis, hydrocarbon reforming, hydrocarbon partial oxidation, oxygenated hydrocarbon reforming, heating and/or pressure reduction of fixed metal hydrides, heating and/or pressure reduction of hydrogen-containing porous adsorptive solids, liquid hydrogen vaporization, and a mixing tank for mixing water or another reactant with transferable (powdered) metal hydrides. Electric power for operating any of these conversion systems may be provided by a hookup at the main terminal or at a receiving location; alternatively, when hydrogen conversion system 13 is traveling en route or is parked at a remote location without electric power, electricity may be generated by an electric generator operated by the main engine of tractor 3 or by a standalone gasoline or diesel-fueled electric generator (not shown).

Gaseous hydrogen produced by hydrogen precursor conversion system 13 is introduced into low pressure hydrogen receiving tanks 15 and may be compressed by compressor system 17 and stored at pressures between 1,000 and 15,000 psig in hydrogen storage system or means 19, which in this example is illustrated as compressed hydrogen storage cylinder or cylinders. Compressor system 17 typically includes an electrically-driven or compressed air-driven reciprocating compressor and associated piping and flow control equipment. In this example, the gaseous hydrogen conversion means for converting the gaseous hydrogen generated by hydrogen precursor conversion system 13 into stored hydrogen comprises low pressure hydrogen receiving tanks 15 and compressor system 17.

Compressed stored hydrogen in storage cylinder 19 may be transferred or offloaded at a receiving facility to hydrogen storage or consuming equipment located at the facility by delivery means 21. Delivery means or system 21 in this example typically includes pressure regulators, flow control valves, a flow metering and recording system, piping, and high pressure hoses and connections for transferring the hydrogen product to the receiving facility. Delivery means 21 may include high pressure hoses and end connections for the direct dispensing of high pressure hydrogen to hydrogen-powered vehicles or devices wherein mobile hydrogen generation and supply system 1 serves as a temporary hydrogen vehicle or device refueling station.

Other embodiments of mobile hydrogen generation and supply system 1 are possible. As mentioned above, various combinations are possible for hydrogen precursor storage means, hydrogen precursor conversion means, gaseous hydrogen conversion means, hydrogen storage means, and stored hydrogen recovery means. In another embodiment, for example, hydrogen precursor storage means may include tank 7 for containing deionized water and tank 9 for containing methanol. Hydrogen precursor conversion system 13 may comprise water electrolysis unit 23 and methanol reformer 25. This particular combination would allow mobile hydrogen generation and supply system 1 to be operated in either of two modes, i.e., electrolyzing water or reforming methanol, depending on the availability of electric power for electrolysis and the availability of the methanol precursor. This flexibility is important because the particular delivery locations and the itinerary of a mobile hydrogen system may be varied and unpredictable.

While the embodiment of mobile hydrogen generation and supply system 1 uses compressed gas cylinders for hydrogen storage system 19, other storage means are possible as described above. For example, fixed metal hydride storage tanks or porous adsorptive solids storage cylinders can be mounted at the location shown for hydrogen storage system 19. In one optional mode of operation, hydrogen may be stored in hydrogen storage system 19 comprising fixed metal hydride storage tanks and/or porous adsorptive solids storage cylinders while mobile hydrogen generation and supply system 1 is parked at a central terminal. Mobile hydrogen generation and supply system 1 may be transported to a receiving location, the hydrogen recovered from hydrogen storage system 19 into low pressure gaseous hydrogen receiving tanks 15, compressed by compressor 17, and delivered directly via delivery means or system 21. In this optional mode, the fixed metal hydride or hydrogen-containing porous adsorptive solids would provide the hydrogen precursors.

Methods for hydrogen precursor conversion, gaseous hydrogen conversion to stored hydrogen, storage means for storing hydrogen, stored hydrogen recovery means, and hydrogen delivery means are generally known in the art, and descriptions of typical processes are given below.

Portable or skid-mounted water electrolysis units for generating hydrogen from deionized water are commercially available. For example, Proton Energy Systems manufactures water electrolyzers of various capacities under the product name HOGEN®. Methanol can be reformed and converted to hydrogen using known processes such as, for example, those described in U.S. Pat. Nos. 5,861,137, 5,997,594, and 6,221,117. Portable or skid-mounted methanol reforming systems are available commercially; for example, IDATECH™ manufactures methanol reformers under the product name FPM 20™.

Hydrogen reacts reversibly to form metal hydrides with certain metals or alloys of metals such as lanthanum, nickel, iron, titanium, magnesium, zirconium, vanadium, and other related metals. Numerous reversible metal hydride compositions have been described in the art for storage and release of hydrogen. Reversible fixed metal hydrides for use in the mobile hydrogen generation and supply system described above may include, for example, a compound of the formula $(M_{1-x}A_x)D_y$ as described in U.S. Pat. No. 5,964,965. In this formula, M is Mg, Be, or a combination thereof, A may be at least one element selected from the group consisting of Li, Ca, Ti, V, Cr, Mn, Fe, Co, Ni, Zn, Al, Y, Zr, Nb, In, Sn, O, Si, B, C, and F. Preferably, A is selected from Zr, Ti, and Ni. D may be at least one metal selected from the group consisting of Fe, Co, Ni, Ru, Rh, Pd, Ir, and Pt. Preferably, D is Pd. In this formula, x is a number or atomic fraction between 0 to 3 and y is a number or atomic fraction between 0 and 0.02.

The metal alloy or the metal hydride material typically is-made in powder form, pressed into pellets, extrudates, or monoliths, and loaded into one or more pressure vessels, cylinders, or canisters. The pressure vessel or vessels should be capable of operating from ambient temperature up to about 300° C. and from atmospheric pressure to about 145 psia, although higher pressures may be used. An embodiment of the present invention may utilize one or more of hydrogen receiving tanks 15; alternatively, gas cylinder(s) 19 could be used.

After generation of gaseous hydrogen by hydrogen precursor conversion system 13, the hydrogen may be compressed in compression system 17 and sorbed at pressures up to 1500 psia and ambient temperature in fixed metal alloy-charged hydrogen receiving tanks 15. Cooling is required as the hydrogen reacts with the metal alloy to form metal hydride compounds. The required cooling may be provided by natural convection with the atmosphere while the mobile hydrogen generation and supply system is in motion, thereby promoting cooling in the air stream surrounding the moving system. Hydrogen may be recovered by heating the tanks and releasing the pressure therein by withdrawing released hydrogen. Heating may be provided by waste heat from the engine cooling system of tractor 3 or by electrical heating. The released hydrogen may be recompressed to pressures up to 1,000 to 15,000 psia by compression system 17 and delivered to a receiving facility.

An alternative method of storing the gaseous hydrogen may be to store the hydrogen as initially generated in hydrogen receiving tanks 15 at typical pressures in the range of 15 to 3,000 psia, compress hydrogen from receiving tanks 15 by compression system 17, and store the compressed hydrogen in hydrogen storage cylinder or cylinders 19 at 1,000 to 15,000 psia. Hydrogen from cylinder or cylinders 19 may be delivered via hydrogen delivery system 21 to the receiving facility.

In a related alternative embodiment, receiving tanks 15 and/or hydrogen storage cylinder or cylinders 19 may be packed with a porous adsorbent material such activated carbon or other high surface area adsorbents which adsorb hydrogen. After generation of gaseous hydrogen by hydrogen precursor conversion system 13, the hydrogen may be compressed in compression system 17 and sorbed at pressures up to 10,000 psia and ambient temperature on the adsorbent in receiving tanks 15 and/or hydrogen storage cylinder or cylinders 19. Cooling may be required as the hydrogen adsorbs, and some of the required cooling may be provided by natural convection with the atmosphere while the mobile hydrogen generation and supply system is in motion, thereby promoting cooling in the air stream surrounding the moving system. Hydrogen may be recovered by heating the receiving tanks and/or cylinders, and releasing the pressure therein by withdrawing released hydrogen. Heating may be provided by waste heat from the tractor engine cooling system or by electrical heating. The released hydrogen may be recompressed to pressures up to 1,000 to 15,000 psia by compression system 17 and delivered to a receiving facility.

In another alternative embodiment, a hydrogen precursor may be converted into a hydrogen-containing intermediate such as synthesis gas containing at least hydrogen and carbon dioxide. Hydrocarbon reformer 25 would be used to reform a hydrocarbon precursor into shifted synthesis gas comprising chiefly hydrogen and carbon dioxide. This may be accomplished while the mobile hydrogen generation and supply system is en route to a receiving facility, and the synthesis gas stored under pressure in receiving tanks 15 and/or storage cylinder or cylinders 19. The hydrogen-containing synthesis gas would be offloaded at a receiving facility, where the synthesis gas would be further processes in a pressure swing adsorption system to produce high purity hydrogen.

In another alternative embodiment, a transferable metal hydride, for example, powdered sodium borohydride ($NaBH_4$), may be the hydrogen precursor and may be converted into a stabilized transferable metal hydride slurry or solution by mixing the powder with water and a stabilizing compound such as sodium hydroxide. This may be accomplished while the mobile hydrogen generation and supply system is en route to a receiving facility. The resulting hydrogen-containing intermediate is relatively stable, but typically the stabilized slurry or solution should be delivered to a receiving location, offloaded, and converted catalytically into hydrogen and sodium metaborate ($NaBO_2$) within a reasonable time after preparation. A typical catalyst which may be used for this purpose, for example, is ruthenium on a suitable carrier. Other borohydrides may be used in this embodiment, such as, for example, $LiBH_4$, $KBH_4$, $Mg(BH_4)_2$, $Ca(BH_4)_2$, and $NH_4BH_4$. Other metal hydrides may be used in this embodiment, such as, for example, $NaAlH_4$, $LiAlH_4$, and $KAlH_4$.

Mobile hydrogen generation and supply system 1 as illustrated in the FIGURE is installed on trailer 5, which is shown as an open flatbed trailer. If desired, the system may be installed in a closed trailer for weather protection and security, and the closed trailed may be fitted with swing-out or swing-up sides to allow access for operation and maintenance when necessary.

Onboard telemetry systems may be used to transmit operating information between the mobile hydrogen generation and supply system and a home terminal location and/or receiving locations while en route from the home terminal to these receiving locations. The information to be exchanged between the mobile system and the home terminal and/or receiving locations may include, for example, operational status, process parameters such as level, pressure or temperature, mobile system location, planned itinerary, traffic and weather information, billing information, and customer order information.

EXAMPLE

Mobile hydrogen generation and supply system 1 is configured for methanol storage in a 200 gallon hydrogen precursor storage tank 7 and deionized water storage in a 300 gallon tank 9. Hydrogen precursor conversion system 13 comprises electrolysis unit 23 that operates on a deionized water feed and methanol reforming unit 25 that operates on deionized water and methanol feeds. The system utilizes six gaseous hydrogen receiving tanks 15 rated for pressures up to 200 psia. Compressor system 17 includes air-driven reciprocating compressor (Haskel Model AGT 32-62) with a capacity of up to 200 SCFH at 7,000 psig. The compressor is operated by compressed air from the compressed air system of tractor 3, and the tractor compression system is oversized for this application. High pressure hydrogen is stored in three hydrogen storage cylinders 19, each of which is rated at a maximum pressure of 7,700 psia and has an internal volume of 6 cu ft. Hydrogen delivery system 21 includes a flow control, flow metering, and piping system capable of hydrogen product flows up to 5,000 SCFM (10 kg/min) and pressures up to 7,000 psia.

Tractor 3 is a Mack CX603 six-wheel tractor and is fitted with a motor-driven 120 VAC generator. Electrolysis unit 23 is a HOGEN™ Model 380 supplied by PROTON® Energy Systems having a hydrogen capacity of 380 SCFH. Methanol reforming unit 25 comprises six FPM 20 reformers supplied by IDATECH (An IDACORP Company) having a total hydrogen capacity of 315 SCFH.

What is claimed is:

1. A mobile hydrogen generation and supply system comprising
    (a) hydrogen precursor storage means for storing one or more hydrogen precursors;
    (b) one or more hydrogen precursor conversion means selected from the group consisting of means for converting a hydrogen precursor into gaseous hydrogen and means for converting a hydrogen precursor into a hydrogen-containing intermediate;
    (c) one or more delivery means selected from the group consisting of delivery means for offloading gaseous hydrogen, delivery means for the direct dispensing of hydrogen to hydrogen-powered vehicles or devices, and delivery means for offloading a hydrogen-containing intermediate; and
    (d) mobile support means for mounting (a) through (c).

2. The system of claim 1 wherein the one or more hydrogen precursors are selected from the group consisting of water, hydrocarbons, oxygenated hydrocarbons, fixed metal hydrides, transferable metal hydrides, hydrogen-containing porous adsorptive solids, liquid hydrogen, and a mixed gas containing hydrogen.

3. The system of claim 2 wherein the hydrogen precursor conversion means comprises one or more process systems selected from the group consisting of water electrolysis, hydrocarbon reforming, hydrocarbon partial oxidation, oxygenated hydrocarbon reforming, fixed metal hydride heating, heating and/or pressure reduction of hydrogen-containing porous solids, and contacting a stabilized aqueous slurry of a transferable metal hydride with a catalyst.

4. The system of claim 1 which further comprises one or more means selected from the group consisting of
    (e) means for converting gaseous hydrogen into stored hydrogen;

(f) means for containing stored hydrogen;

(g) means for converting stored hydrogen into gaseous hydrogen; and (h) storage means for storing a hydrogen-containing intermediate.

5. The system of claim 4 wherein the means for converting the gaseous hydrogen into stored hydrogen comprises one or more process systems selected from the group consisting of compression, contacting the gaseous hydrogen with one or more hydrogen-reactive metals to form fixed metal hydrides, and contacting the gaseous hydrogen with one or more hydrogen-adsorbing porous solids.

6. The system of claim 4 wherein the means for containing stored hydrogen comprises one or more systems selected from the group consisting of pressurized gas cylinders, fixed metal hydride storage cylinders, porous adsorptive solids storage cylinders, and cryogenic liquid storage tanks.

7. The system of claim 6 wherein the means for converting stored hydrogen into gaseous hydrogen comprises one or more systems selected from the group consisting of gas pressure regulators, fixed metal hydride storage cylinder heating systems, porous adsorptive solids storage cylinder heating systems, gas compression systems, and cryogenic liquid vaporizers.

8. The system of claim 4 wherein the delivery means comprises one or more systems selected from the group consisting of flexible pressurized gas hoses with gas dispensing connections; a portable crane for lifting pressurized gas cylinders, fixed metal hydride storage cylinders, or porous adsorptive solids storage cylinders; and means for offloading a hydrogen-containing intermediate.

9. The system of claim 1 wherein the mobile support means for mounting (a) through (c) comprises transportation means selected from the group consisting of trucks, trailers, tractor-trailers, rail cars, barges, ships, and aircraft.

10. A method for the mobile generation and storage of hydrogen comprising (a) providing a mobile hydrogen generation and supply system comprising hydrogen precursor storage means for storing one or more hydrogen precursors; hydrogen precursor conversion means for converting a hydrogen precursor into gaseous hydrogen; gaseous hydrogen conversion means for converting gaseous hydrogen into stored hydrogen; hydrogen storage means for containing stored hydrogen; stored hydrogen conversion means for converting stored hydrogen into gaseous hydrogen; gaseous hydrogen delivery means for the direct dispensing of hydrogen to hydrogen-powered vehicles or devices; and mobile support means for mounting the hydrogen precursor storage means, hydrogen precursor conversion means, gaseous hydrogen conversion means, hydrogen storage means, stored hydrogen conversion means, and gaseous hydrogen delivery means;

(b) transporting the mobile hydrogen generation and supply system to a first location and loading one or more hydrogen precursors into respective storage means for storing the one or more hydrogen precursors;

(c) transporting the mobile hydrogen generation and supply system from the first location to a second location while concurrently generating gaseous hydrogen by converting one or more of the hydrogen precursors into gaseous hydrogen and converting the gaseous hydrogen into stored hydrogen; and (d) at a second location, (1) dispensing at least a portion of the stored hydrogen, or (2) converting at least a portion of the stored hydrogen to gaseous hydrogen and dispensing the gaseous hydrogen, or (3) dispensing at least a portion of the stored hydrogen and converting at least another portion of the stored hydrogen to gaseous hydrogen and dispensing the gaseous hydrogen.

11. The method of claim 10 which further comprises generating gaseous hydrogen at the second location by converting one or more of the hydrogen precursors into gaseous hydrogen and dispensing the gaseous hydrogen to hydrogen-powered vehicles or devices at the second location.

12. A method for supplying hydrogen to one or more receiving locations comprising (a) providing a mobile hydrogen generation and supply system comprising hydrogen precursor storage means for storing one or more hydrogen precursors; hydrogen precursor conversion means for converting a hydrogen precursor into gaseous hydrogen; gaseous hydrogen conversion means for converting gaseous hydrogen into stored hydrogen; hydrogen storage means for containing stored hydrogen; stored hydrogen conversion means for converting stored hydrogen into gaseous hydrogen; gaseous hydrogen delivery means for the direct dispensing of hydrogen to hydrogen-powered vehicles or devices; and mobile support means for mounting the hydrogen precursor storage means, hydrogen precursor conversion means, gaseous hydrogen conversion means, hydrogen storage means, stored hydrogen conversion means, and gaseous hydrogen delivery means;

(b) identifying the one or more receiving locations;

(c) determining one or more hydrogen precursors required to generate hydrogen for the one or more receiving locations;

(d) determining a source location or locations for the one or more hydrogen precursors and moving the mobile hydrogen generation and supply system to the source location or locations;

(e) loading and storing the one or more hydrogen precursors in the hydrogen precursor storage means at the source location or locations;

(f) transporting the mobile hydrogen generation and supply system from the source location or locations to the one or more receiving locations while concurrently generating gaseous hydrogen by converting one or more of the hydrogen precursors into gaseous hydrogen and converting the gaseous hydrogen to stored hydrogen; and (g) at each of the one or more receiving locations, (1) dispensing at least a portion of the stored hydrogen by offloading the hydrogen storage means, or (2) converting at least a portion of the stored hydrogen to gaseous hydrogen and dispensing the gaseous hydrogen, or (3) dispensing at least a portion of the stored hydrogen by offloading the hydrogen storage means and converting at least another portion of the stored hydrogen to gaseous hydrogen and dispensing the gaseous hydrogen.

13. The method of claim 12 wherein one of the one or more hydrogen precursors comprises methanol, the hydrogen precursor conversion means comprises a methanol reformer, and the hydrogen storage means for containing stored hydrogen comprises a fixed metal hydride hydrogen storage system.

* * * * *